(12) United States Patent
Menon et al.

(10) Patent No.: US 8,669,491 B2
(45) Date of Patent: Mar. 11, 2014

(54) HARD-FACING ALLOYS HAVING IMPROVED CRACK RESISTANCE

(76) Inventors: Ravi Menon, Goodlettsville, TN (US); Jack Garry Wallin, Scottsville, KY (US); Francis Louis LeClaire, Bowling Green, KY (US)

( * ) Notice: Subject to any disclaimer, the term of this patent is extended or adjusted under 35 U.S.C. 154(b) by 1394 days.

(21) Appl. No.: 11/356,409

(22) Filed: Feb. 16, 2006

(65) Prior Publication Data

US 2007/0187369 A1 Aug. 16, 2007

(51) Int. Cl.
*B23K 35/22* (2006.01)
*B23K 35/02* (2006.01)
*C22C 38/36* (2006.01)
*C22C 38/22* (2006.01)

(52) U.S. Cl.
USPC ............. 219/146.1; 219/145.22; 420/12; 420/101

(58) Field of Classification Search
USPC ............ 219/146.1, 76.1, 137 WM, 145.22; 420/101, 106, 110, 111, 61, 64, 68, 69, 420/10, 11, 12, 33; 148/321, 324, 325, 332, 148/334
See application file for complete search history.

(56) References Cited

U.S. PATENT DOCUMENTS

| | | | | |
|---|---|---|---|---|
| 3,368,887 A | * | 2/1968 | Enis et al. | 420/91 |
| 3,575,737 A | * | 4/1971 | Carlen et al. | 148/578 |
| 3,876,475 A | * | 4/1975 | Ramqvist | 420/38 |
| 4,122,238 A | * | 10/1978 | Frantzerb, Sr. | 428/558 |
| 4,331,857 A | * | 5/1982 | Crisci et al. | 219/137 WM |
| 4,396,822 A | * | 8/1983 | Kishida et al. | 219/137 WM |
| 4,423,119 A | * | 12/1983 | Brown et al. | 428/558 |
| 4,800,131 A | * | 1/1989 | Marshall et al. | 428/558 |
| 4,810,850 A | * | 3/1989 | Tenkula et al. | 219/146.1 |
| 4,822,415 A | * | 4/1989 | Dorfman et al. | 420/61 |
| 4,897,519 A | * | 1/1990 | Clark et al. | 219/76.14 |
| 4,987,288 A | * | 1/1991 | Yonker, Jr. | 219/146.1 |
| 5,095,191 A | * | 3/1992 | Bushey et al. | 219/137 WM |
| 5,192,016 A | * | 3/1993 | Araki et al. | 228/147 |
| 5,250,355 A | * | 10/1993 | Newman et al. | 428/367 |
| 5,348,212 A | * | 9/1994 | Galanes | 228/135 |
| 5,525,779 A | * | 6/1996 | Santella et al. | 219/137 WM |
| 5,744,782 A | * | 4/1998 | Sampath et al. | 219/146.1 |
| 6,124,569 A | * | 9/2000 | Bonnet et al. | 219/146.1 |
| 6,228,183 B1 | * | 5/2001 | Bangaru et al. | 148/320 |
| 6,521,060 B1 | * | 2/2003 | Kurata et al. | 148/428 |
| 6,521,867 B2 | * | 2/2003 | Bonnet et al. | 219/137 WM |
| 6,702,905 B1 | * | 3/2004 | Qiao et al. | 148/326 |
| 6,841,246 B2 | * | 1/2005 | Shimizu et al. | 428/375 |
| 6,940,042 B2 | * | 9/2005 | Hara et al. | 219/145.22 |

(Continued)

FOREIGN PATENT DOCUMENTS

| | | | |
|---|---|---|---|
| DE | 27 54 437 | | 7/1979 |
| DE | 2754437 A | * | 7/1979 |
| DE | 3543601 A1 | * | 6/1986 ............. C22C 38/34 |

*Primary Examiner* — Henry Yuen
*Assistant Examiner* — Hemant Mathew
(74) *Attorney, Agent, or Firm* — Brinks Gilson & Lione

(57) ABSTRACT

Weld deposit compositions with improved crack resistance, improved wear resistance, and improved hardness are provided by controlling matrix grain size and balancing Titanium and/or Niobium with Carbon and/or Boron content. Additionally, the presence of coarse chromium carbides is drastically decreased to reduce the amount of check-cracking. Preferably, the weld deposit is produced from a flux-cored or metal-cored wire. The weld deposit characteristics include a matrix having a fine grain size, small evenly dispersed carbides within the matrix, and a small amount of Carbon in the matrix.

16 Claims, 5 Drawing Sheets

(56) References Cited

U.S. PATENT DOCUMENTS

| | | | |
|---|---|---|---|
| 6,953,508 B2 * | 10/2005 | Ikeda et al. | 148/320 |
| 7,459,041 B2 * | 12/2008 | Beguinot et al. | 148/664 |
| 7,794,651 B2 * | 9/2010 | Beguinot et al. | 420/110 |

\* cited by examiner

HARD-FACING ALLOYS HAVING IMPROVED CRACK RESISTANCE

FIELD

The present disclosure relates to alloy compositions for arc welding and more particularly to weld deposit compositions suitable for hard surfacing that reduce cracking and increase wear resistance and hardness.

BACKGROUND

The statements in this section merely provide background information related to the present disclosure and may not constitute prior art.

Hard-facing relates generally to techniques or methods of applying a hard, wear resistant alloy to the surface of a substrate, such as a softer metal, to reduce wear caused by abrasion, erosion, corrosion, and heat, among other operational or environmental conditions. A variety of methods are available to apply the wear resistant alloy to the substrate, among which includes welding, where a welding wire is deposited over the substrate surface to produce a weld deposit that is highly wear resistant. The welding wire may include a solid wire, metal-cored wire or a flux-cored wire, wherein the metal-cored wire generally comprises a metal sheath filled with a powdered metal alloy and the flux-cored wire generally comprises a mixture of powdered metal and fluxing ingredients. Accordingly, flux-cored and metal-cored wires offer additional versatility due to the wide variety of alloys that can be included within the powdered metal core in addition to the alloy content provided by the sheath.

One known welding wire material that is commonly used for hard-facing includes chromium carbides. While conventional chromium carbides provide good wear resistance, the weld deposits produced from chromium carbide welding wires can produce a cross-checking pattern in the hard weld deposit surface, which is undesirable due to an increased susceptibility to cracking from such patterns. Additionally, coarse chromium carbides contribute to check-cracking, which are cracks that develop perpendicular to a bead direction and accelerate abrasive wear.

SUMMARY

In general, weld deposits with improved crack resistance, improved wear resistance, and improved hardness are provided by using nucleation sites to control matrix grain size and by balancing Titanium and/or Niobium with Carbon and/or Boron content. Additionally, the presence of coarse chromium carbides is drastically decreased to reduce the amount of check-cracking. Preferably, the weld deposit is produced from a flux-cored/metal-cored wire, however, it should be understood that other types of welding consumables such as a solid wires or coated shielded metal arc electrodes may also be employed. The weld deposit characteristics include a matrix having a fine grain size, small evenly dispersed carbides within the matrix, and a small amount of Carbon in the matrix. Additional alloying elements are provided for desired properties of the weld deposit and are described in greater detail herein.

In one form of the present disclosure, a weld deposit composition produced from a flux-cored or metal-cored welding wire is provided that comprises, by percent mass, between approximately 0.7% and approximately 2.0% Carbon, between approximately 0.2% and approximately 0.5% Manganese, between approximately 0.5% and approximately 1.1% Silicon, between approximately 2.0% and approximately 8.0% Chromium, between approximately 2.0% and approximately 6.0% Molybdenum, between approximately 2.0% and approximately 5.0% Tungsten, between approximately 2.0% and approximately 8.0% Niobium and Titanium, between approximately 1.0% and approximately 2.5% Vanadium, between approximately 0.2% and approximately 0.9% Boron, and a balance comprising Iron. In additional forms, the Carbon comprises approximately 1.1%, the Manganese comprises approximately 0.3%, the Silicon comprises approximately 0.8%, the Chromium comprises approximately 4.0%, the Molybdenum comprises approximately 4.0%, the Tungsten comprises approximately 3.5%, the Niobium and Titanium comprise approximately 3.2%, the Vanadium comprises approximately 1.8%, and the Boron comprises approximately 0.5%.

In another form, a weld deposit composition produced from a flux-cored or metal-cored welding wire is provided that comprises, by percent mass, between approximately 0.7% and approximately 2.0% Carbon, between approximately 0.1% and approximately 0.5% Manganese, between approximately 0.7% and approximately 1.4% Silicon, between approximately 6.0% and approximately 11.0% Chromium, between approximately 0.5% and approximately 2.0% Molybdenum, between approximately 2.0% and approximately 8.0% Niobium and Titanium, between approximately 0.2% and approximately 1.0% Vanadium, between approximately 0.2% and approximately 0.9% Boron, between approximately 0.4% and approximately 0.8% Copper, and a balance comprising Iron. In additional forms, the Carbon comprises approximately 1.1%, the Manganese comprises approximately 0.3%, the Silicon comprises approximately 0.8%, the Chromium comprises approximately 9.0%, the Molybdenum comprises approximately 0.8%, the Niobium and Titanium comprise approximately 3.5%, the Vanadium comprises approximately 0.3%, the Boron comprises approximately 0.5%, and the Copper comprises approximately 0.6%.

In yet other forms of the present disclosure, a flux-cored or metal-cored welding wire capable of producing a weld deposit having the above-mentioned elements and a welded structure having a weld deposit with the above elements is provided by the teachings of the present disclosure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
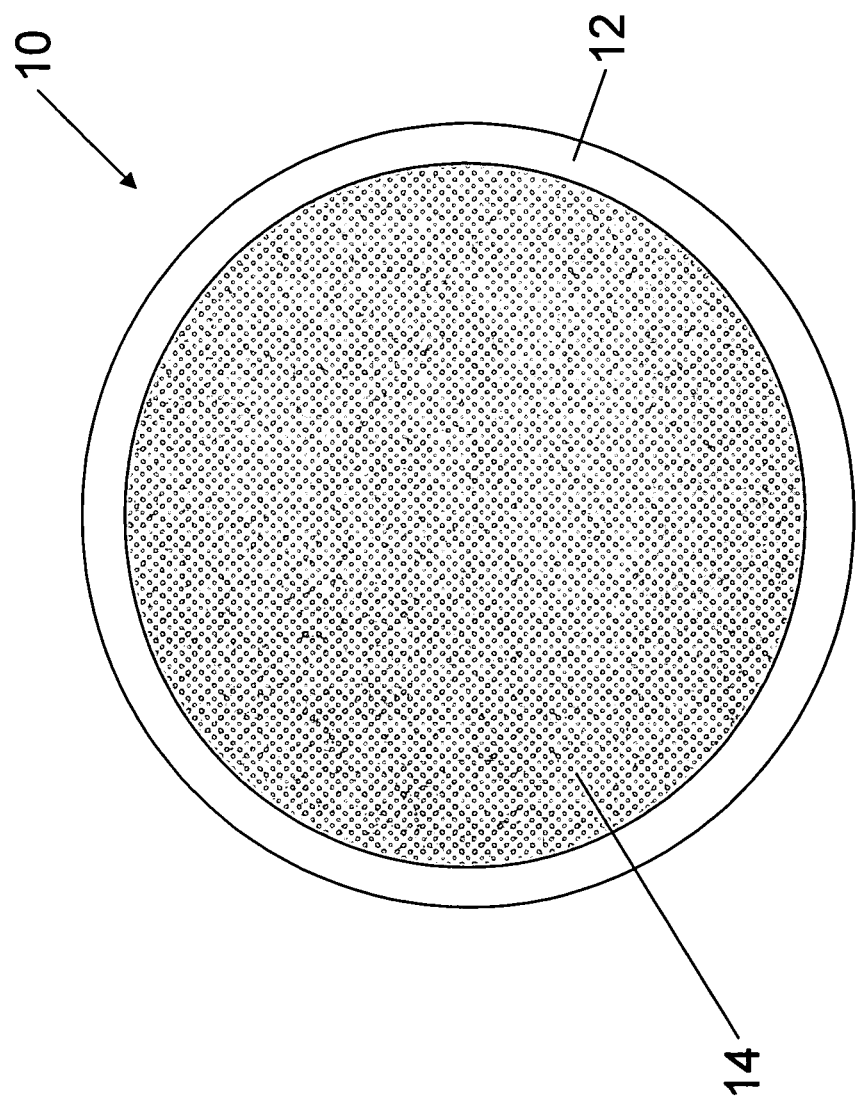
FIG. 1 is a cross-sectional view of a flux-cored or metal-cored welding wire constructed in accordance with the principles of the present disclosure.

The following description is merely exemplary in nature and is not intended to limit the present disclosure, application, or uses. It should be understood that throughout the drawings, corresponding reference numerals indicate like or corresponding parts and features.

Weld deposits for use in hard-surfacing applications that produce improved crack resistance, improved wear resistance, and improved hardness are provided by controlling matrix grain size and balancing Titanium and/or Niobium with Carbon content according to the teachings of the present disclosure. Additionally, the presence of coarse chromium carbides is drastically reduced to reduce the amount of check-cracking. Preferably, the weld deposit is produced from a flux-cored wire, however, it should be understood that other types of welding consumables such as a solid wire or coated shielded metal arc electrodes may also be employed while remaining within the scope of the present disclosure. The weld deposit characteristics include a matrix having a fine grain size, small evenly dispersed carbides within the matrix, and a small amount of Carbon in the matrix. Additional alloying elements are provided for various properties of the weld deposit and are described in greater detail below.

Figure 2:
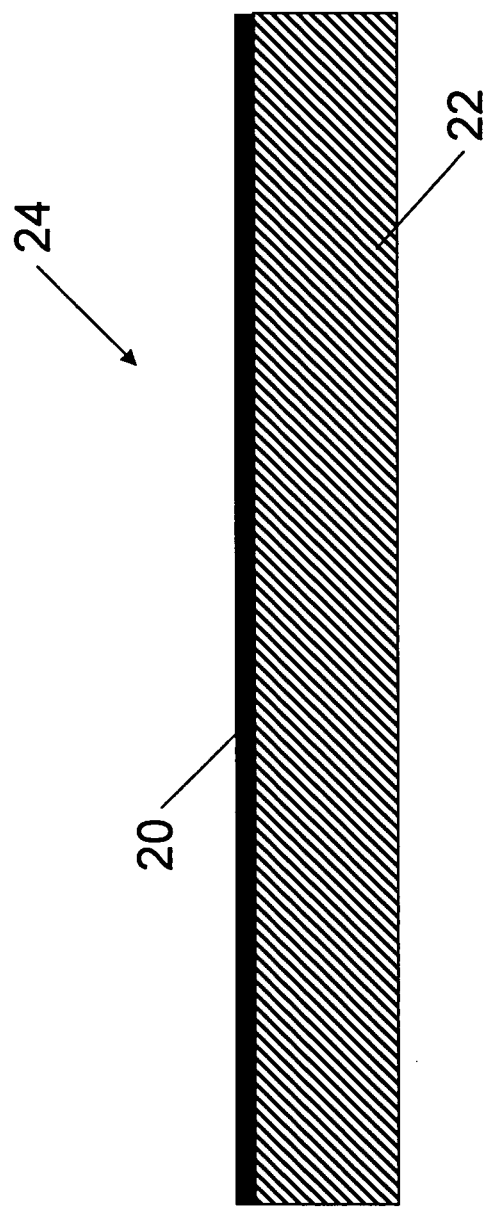
FIG. 2 is a perspective view of a welded structure having a hard-facing surface constructed in accordance with the principles of the present disclosure.

Referring to FIG. 1, a flux-cored or metal-cored welding wire capable of producing weld deposits according to the teachings of the present disclosure is illustrated and generally indicated by reference numeral 10. The flux-cored/metal-cored welding wire 10 includes a mild steel sheath 12 that is filled with a powdered metal alloy core 14. As shown in FIG. 2, the flux-cored/metal-cored welding wire 10 produces a hard-facing surface 20 when welded onto a substrate 22, to produce a welded structure 24 having improved crack resistance, wear resistance, and hardness.

The specific alloy elements and their amounts that are present in the weld deposits according to the teachings of the present disclosure are now described in greater detail.

Referring to Table 1 below, two (2) weld deposit compositions (including both target percentages and ranges of percent elements by weight) according to the present disclosure are listed as "Weld Deposit A" and "Weld Deposit B," along with typical M7 tool steel and martensitic hard-facing compositions for purposes of comparison. The M7 tool steel is a composition that is used quite frequently in applications involving significant wear and impact. With the compositional modifications to this M7 tool steel composition made with Weld Deposit A, there is significant improvement in the wear resistance. The martensitic hardfacing composition is a lower cost overlay that has significant usage in the hard-facing industry in applications requiring moderate resistance to wear and impact. Weld Deposit B is a modification of this martensitic hardfacing composition that results in a significant improvement in wear resistance.

TABLE 1

| | M7 Tool Steel | Weld Deposit A Target | Weld Deposit A Range | Martensitic Hard Facing | Weld Deposit B Target | Weld Deposit B Range |
|---|---|---|---|---|---|---|
| C | 0.9 | 1.1 | 0.7-2.0 | 0.6 | 1.1 | 0.7-2.0 |
| Mn | 0.4 | 0.3 | 0.2-0.5 | 1.5 | 0.2 | 0.1-0.5 |
| Si | 0.8 | 0.8 | 0.5-1.1 | 1.3 | 1.0 | 0.7-1.4 |
| Cr | 3.5 | 4.0 | 2.0-8.0 | 6.0 | 9.0 | 6.0-11.0 |
| Mo | 8.0 | 4.0 | 2.0-6.0 | 0.7 | 0.8 | 0.5-2.0 |
| W | 1.5 | 3.5 | 2.0-5.0 | 0 | 0 | 0 |
| Fe | Bal | Bal | Bal | Bal | Bal | Bal |
| Nb, Ti | 0 | 3.2 | 2.0-8.0 | 0 | 3.5 | 2.0-8.0 |
| V | 1.6 | 1.8 | 1.0-2.5 | 0 | 0.3 | 0.2-1.0 |
| B | 0 | 0.5 | 0.2-0.9 | 0 | 0.5 | 0.2-0.9 |
| Cu | 0 | 0 | 0 | 0 | 0.6 | 0.4-0.8 |

Each element and its contribution to properties of the weld deposit are now described in greater detail.

Carbon (C) is an element that improves hardness and strength. The preferred amount of Carbon for both Weld Deposit A and Weld Deposit B is between approximately 0.7 and 2.0 percent, with a target value of approximately 1.1%.

Manganese (Mn) is an element that improves hardness, toughness and acts as a deoxidizer, in which the deoxidizer also acts as a grain refiner when fine oxides are not floated out of the metal or if the final grain boundary area is increased by final solidification of a manganese-silicon rich eutectic phase. The preferred amount of manganese for Weld Deposit A is between approximately 0.2 and 0.5 percent, with a target value of approximately 0.3%. The preferred amount of manganese for Weld Deposit B is between approximately 0.1 and 0.5 percent, with a target value of approximately 0.2%.

Silicon (Si) is an element that acts as a deoxidizer to improve corrosion resistance and which also acts as a grain refiner when fine oxides are not floated out of the metal or if the final grain boundary area is increased by final solidification of a manganese-silicon rich eutectic phase. The preferred amount of Silicon for Weld Deposit A is between approximately 0.5 and 1.1 percent, with a target value of approximately 0.8%. The preferred amount of Silicon for Weld Deposit B is between approximately 0.7 and 1.4 percent, with a target value of approximately 1.0%. Silicon is also added to the weld metal to improve fluidity.

Chromium (Cr) is an element that provides depth of hardenability, corrosion resistance, carbide/boride formation, and improved high temperature creep strength. The preferred amount of Chromium for Weld Deposit A is between approximately 2.0 and approximately 8.0 percent, with a target value of approximately 4.0%. The preferred amount of Chromium for Weld Deposit B is between approximately 6.0 and approximately 11.0 percent, with a target value of approximately 9.0%.

Molybdenum (Mo) is an element that provides improved tensile strength of the weld deposit as carbide, boride, or a solid-solution strengthener. Tungsten and molybdenum act as solid-solution strengtheners. Tungsten and molybdenum can be substituted for each other in many cases, but the molybdenum is more effective at increasing matrix strength and hardness. The preferred amount of molybdenum for Weld Deposit A is between approximately 2.0 and approximately 6.0 percent, with a target value of approximately 4.0%. The preferred amount of molybdenum for Weld Deposit B is between approximately 0.1 and approximately 2.0 percent, with a target value of approximately 0.8%.

Tungsten (W) is an element that provides improved creep strength of the weld deposit. The preferred amount of tungsten for Weld Deposit A is between approximately 2.0 and approximately 5.0 percent, with a target value of approximately 3.5%. Tungsten is not present in Weld Deposit B due to cost considerations and the presence of molybdenum.

Titanium (Ti) and Niobium (Nb) act as grain refiners, deoxidizers, and primary carbide/boride formers. The amounts of Titanium and Niobium are balanced with the amount of Carbon/Boron as set forth above in order to reduce the amount of Carbon/boron in the weld metal matrix and grain boundaries, which reduces the possibility of cracking and improves the toughness of the hard-facing surface. The ratios of the elements are based on the atomic weights and the type of intermetallic carbide/boride desired. The Titanium is generally 4 times the mass of Carbon, and the niobium is generally 8 times the mass of Carbon. Any excess Carbon is left to the secondary carbide formers and the matrix. The ratio of the Titanium to Boron is 4.4 for Titanium Boride and 2.2 for Titanium Diboride. The Niobium/Boron ratio is 8.6 for Niobium Boride and 4.3 for Niobium Diboride. The Titanium/Niobium and the Carbon/Boron pairs are substitutional in nature, and thus deviations from these ratios can be tolerated and should be construed as falling within the scope of the present disclosure. Additionally, particles of these elements freeze at a very high temperature and are therefore considered primary carbides/borides.

Vanadium (V) is secondary carbide former and a grain refiner and thus increases toughness of the weld deposit. The preferred amount of Vanadium for Weld Deposit A is between approximately 1.0 and approximately 2.5 percent, with a target value of approximately 1.8%. The preferred amount of Vanadium for Weld Deposit B is between approximately 0.2 and approximately 1.0 percent, with a target value of approximately 0.3%.

The Titanium and Niobium when combined with Carbon and/or Boron will act as grain refiners to provide nucleation sites for the formation of many small grains, which contribute to improved crack resistance. Additionally, the small grains improve ductility and reduce hot tearing by increasing the grain boundary area and reducing the average distance that the grains have to slide against each other to accommodate the local strain induced by shrinkage due to cooling. The grain boundary sliding is known as shear, which is generally responsible for hot-tearing in the grain boundaries.

Boron (B) is an element that provides interstitial hardening in the matrix, strengthens the grain boundaries by accommodating mismatches due to incident lattice angles of neighboring grains with respect to the common grain boundary, and by itself or in combination with Carbon, form nucleation sites as intermetallics with Titanium and/or Niobium. The preferred amount of Boron for Weld Deposit A is between approximately 0.2 and approximately 0.9 percent, with a target value of approximately 0.5%. The preferred amount of Boron for Weld Deposit B is between approximately 0.2 and approximately 0.9 percent, with a target value of approximately 0.5%.

Copper (Cu) is an alloying element that can be used in steels to modify the structure by providing a secondary phase to partition/refine grains or by depressing the freezing point of the austenite phase for a shorter freezing range. The shorter freezing range means that less shear strain is exerted on the phase due to the coefficient of thermal expansion/contraction. In effect, there is less strain due to the contraction that occurs upon cooling because the austenite is cooled through only half of its normal freezing range. Since austenite is prone to hot tearing, targeting this phase to avoid any excess shear stresses greatly reduces this failure mechanism in the alloy. The preferred amount of Copper for Weld Deposit B is between approximately 0.4% and approximately 0.8%, with a target value of approximately 0.6%. Preferably, there is no Copper in Weld Deposit A.

The compositions of the weld deposits according to the teachings of the present disclosure are formulated to reduce the amount of cross-checking as compared with other martensitic and tool steel welding wire deposits while improving wear resistance. In exemplary testing, the composition of Weld Deposit A has shown improved hardness and weight loss when compared to other weld deposit compositions as shown below in Table 2.

TABLE 2

| Composition | HRC Hardness Value | ASTM G-65 Wear Test Weight Loss |
| --- | --- | --- |
| Weld Deposit A | HRC 62 to 67 | 0.13 grams |
| Typical Chromium Carbide | HRC 55 to 63 | 0.15 grams |
| M7 Tool Steel | HRC 60 to 64 | 0.55 grams |
| Martensitic Deposit | HRC 58 to 60 | 1.30 grams |
| Weld Deposit B | HRC 63-65 | 0.21 grams |

Figure 3:
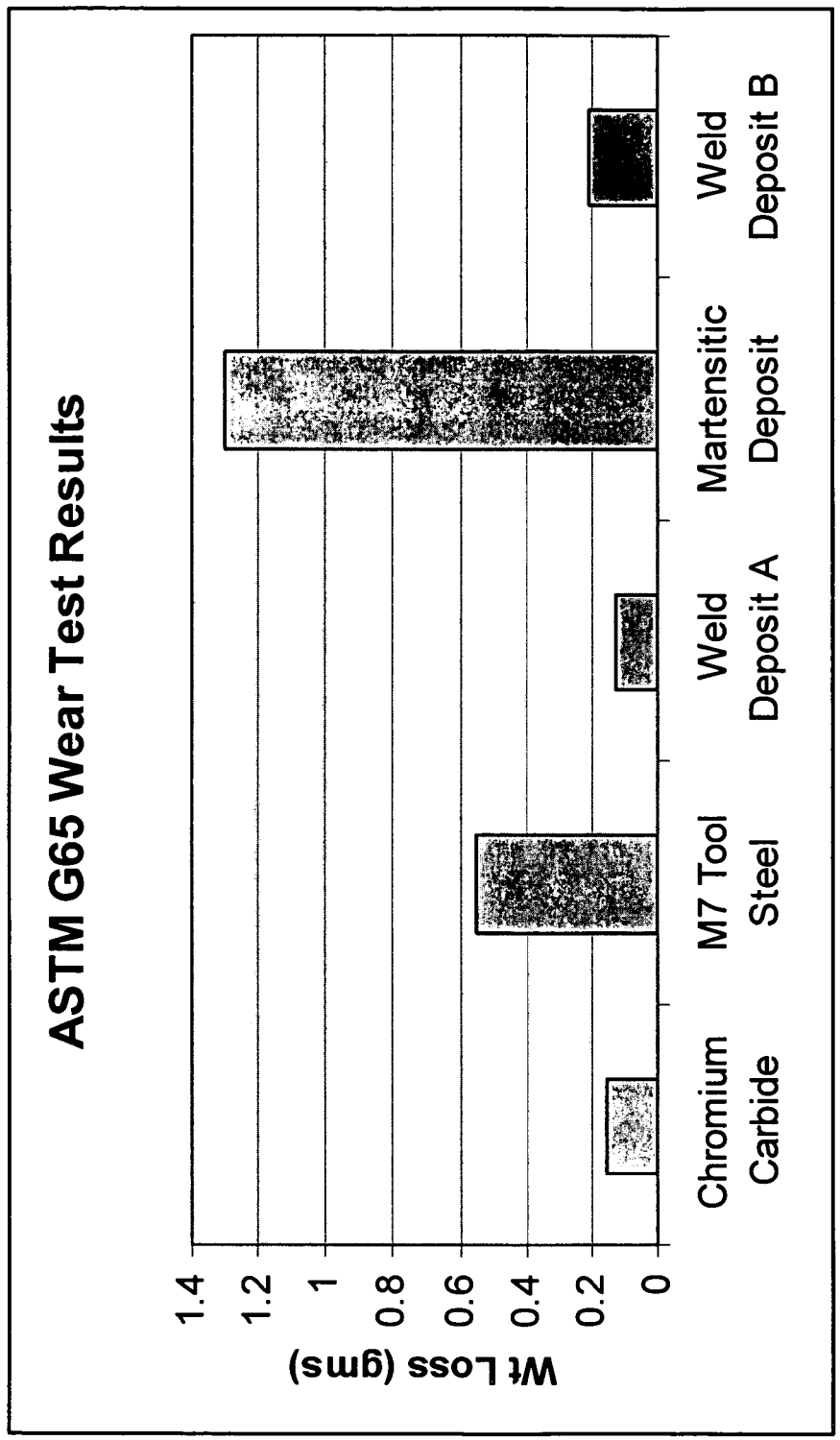
FIG. 3 is a chart illustrating test results of compositions in accordance with the present disclosure compared with prior art compositions.

Referring to FIG. 3, the wear resistance of the compositions of the present disclosure and those from prior art are illustrated. Comparing prior art alloys, the chromium carbide hard-facing has been seen to have the best wear resistance (lowest weight loss in the ASTM G65 wear test). However, the chromium carbide deposit contains relief check-cracks that make the overlay less suitable for applications that involve both high impact and wear. With the composition according to Weld Deposit A, wear resistance is enhanced to be better than that of the chromium carbide deposit and the M7 Tool Steel as shown. Similarly, the composition according to Weld Deposit B results in significantly better wear resistance than the Martensitic deposit. Therefore, Weld Deposit B is highly suitable in applications involving moderate impact and abrasion with only marginal increase in cost over the Martensitic deposit.

By controlling the matrix grain size and balancing the Titanium and/or Niobium with the Carbon/Boron content, weld deposits having improved crack resistance are produced according to the teachings of the present disclosure. Additionally, the weld deposits according to the present disclosure do not contain coarse chromium carbides. The absence of the coarse chromium carbide phases will reduce the presence of check-cracking.

Figure 4:
FIG. 4 is a photomicrograph of a prior art chromium carbide weld deposit having a matrix with coarse chromium carbides.
Figure 5A:
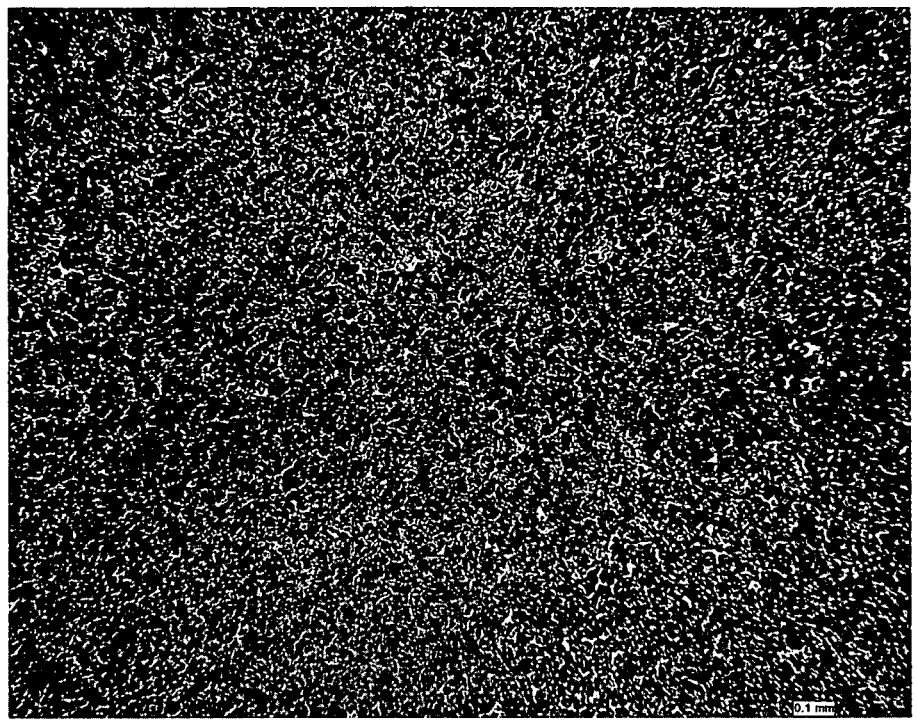
FIG. 5a is a photomicrograph of a weld deposit exhibiting a matrix having a fine grain size in accordance with the teachings of the present disclosure.
Figure 5B:
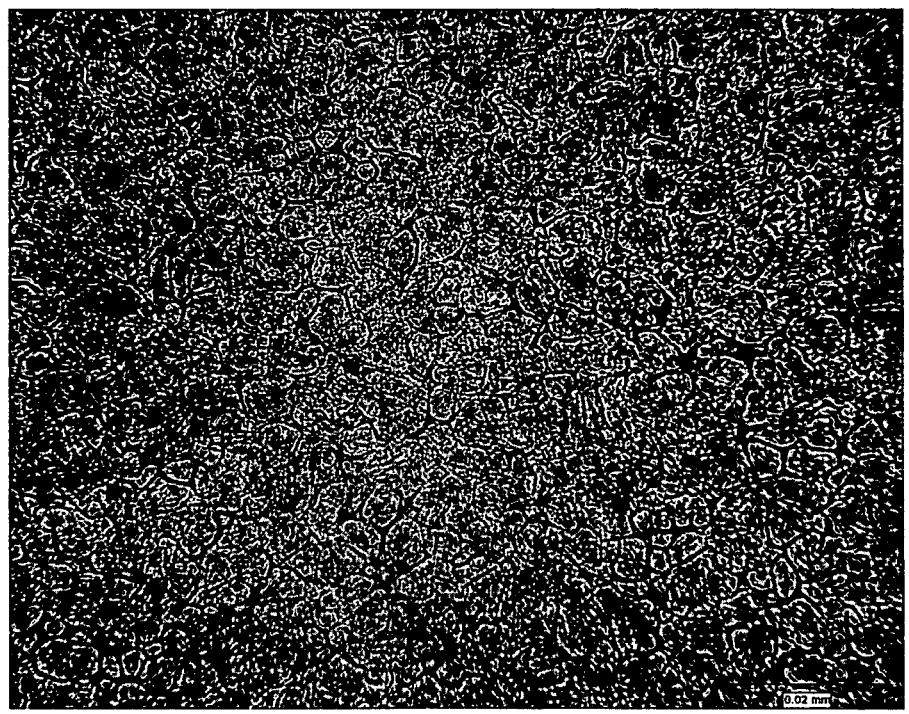
FIG. 5b is a photomicrograph of a second weld deposit exhibiting a matrix having a fine grain size in accordance with the teachings of the present disclosure.

By way of example, FIG. 4 illustrates a prior art weld deposit matrix having coarse chromium carbides, and FIGS. 5a and 5b illustrate the weld deposit matrices according to the present disclosure without such coarse chromium carbides. As shown, the exemplary weld deposits of the present disclosure exhibits a fine grain size within the matrix, combined with small and evenly dispersed carbides. The fine grain size and evenly dispersed carbides contribute to improved crack resistance and improved wear resistance.

The description of the disclosure is merely exemplary in nature and, thus, variations that do not depart from the gist of the disclosure are intended to be within the scope of the disclosure. For example, the weld deposit according to the teachings of the present disclosure may be produced from welding wire types other than flux-cored/metal-cored wires, such as solid wires, while remaining within the scope of the present disclosure. Such variations are not to be regarded as a departure from the spirit and scope of the disclosure.

What is claimed is:

1. A weld deposit composition produced from a flux-cored welding wire consisting of, by percent mass:
   between 0.7% and 2.0% Carbon;
   between 0.1% and 0.5% Manganese;
   between 0.7% and 1.4% Silicon;
   between 6.0% and 11.0% Chromium;
   between 0.5% and 2.0% Molybdenum;
   between 2.0% and 8.0% sum of Niobium and Titanium;
   between 0.2% and 1.0% Vanadium;
   between 0.2% and 0.9% Boron;
   between 0.4% and 0.8% Copper; and
   a balance comprising Iron;
   wherein amounts of Titanium and Niobium are balanced with amounts of Carbon and Boron to form intermetallic carbides and borides that act as grain refiners; the ratio of Titanium or Niobium to Boron being about 4.4 for Titanium Boride, about 2.2 for Titanium Diboride, about 8.6 for Niobium Boride, and about 4.3 for Niobium Diboride.

2. The weld deposit composition according to claim 1, wherein the Carbon comprises approximately 1.1%.

3. The weld deposit composition according to claim 1, wherein the Manganese comprises approximately 0.2%.

4. The weld deposit composition according to claim 1, wherein the Silicon comprises approximately 1.0%.

5. The weld deposit composition according to claim 1, wherein the Chromium comprises approximately 9.0%.

6. The weld deposit composition according to claim 1, wherein the Molybdenum comprises approximately 0.8%.

7. The weld deposit composition according to claim 1, wherein the Niobium and Titanium comprise approximately 3.5%.

8. The weld deposit composition according to claim 1, wherein the Vanadium comprises approximately 0.3%.

9. The weld deposit composition according to claim 1, wherein the Boron comprises approximately 0.5%.

10. The weld deposit composition according to claim 1, wherein the Copper comprises approximately 0.6%.

11. A flux-cored welding wire capable of producing a weld deposit composition consisting of, by percent mass:
    between 0.7% and 2.0% Carbon;
    between 0.1% and 0.5% Manganese;
    between 0.7% and 1.4% Silicon;
    between 6.0% and 11.0% Chromium;
    between 0.5% and 2.0% Molybdenum;
    between 2.0% and 8.0% sum of Niobium and Titanium;
    between 0.2% and 1.0% Vanadium;
    between 0.2% and 0.9% Boron;
    between 0.4% and 0.8% Copper; and
    a balance comprising Iron;
    wherein amounts of Titanium and Niobium are balanced with amounts of Carbon and Boron to form intermetallic carbides and borides that act as grain refiners; the ratio of Titanium or Niobium to Boron being about 4.4 for Titanium Boride, about 2.2 for Titanium Diboride, about 8.6 for Niobium Boride, and about 4.3 for Niobium Diboride.

12. A welded structure comprising at least one weld deposit, the weld deposit having a composition consisting of, by percent mass:
    between 0.7% and 2.0% Carbon;
    between 0.1% and 0.5% Manganese;
    between 0.7% and 1.4% Silicon;
    between 6.0% and 11.0% Chromium;
    between 0.5% and 2.0% Molybdenum;
    between 2.0% and 8.0% sum of Niobium and Titanium;
    between 0.2% and 1.0% Vanadium;
    between 0.2% and 0.9% Boron;
    between 0.4% and 0.8% Copper; and
    a balance comprising Iron;
    wherein amounts of Titanium and Niobium are balanced with amounts of Carbon and Boron to form intermetallic carbides and borides that act as grain refiners; the ratio of Titanium or Niobium to Boron being about 4.4 for Titanium Boride, about 2.2 for Titanium Diboride, about 8.6 for Niobium Boride, and about 4.3 for Niobium Diboride.

13. The weld deposit composition according to claim 1, wherein the carbides are evenly dispersed within a matrix of the weld deposit composition.

14. The weld deposit composition according to claim 1, wherein the weld deposit composition has a hardness value of 63 to 65 HRC.

15. The weld deposit composition according to claim 1, wherein the carbides have a size less than 0.1 mm.

16. The weld deposit composition according to claim 1, wherein a matrix of the weld deposit composition has grains with a grain size less than 0.1 mm.

* * * * *